United States Patent
Liu et al.

(10) Patent No.: US 8,713,305 B2
(45) Date of Patent: Apr. 29, 2014

(54) PACKET TRANSMISSION METHOD, APPARATUS, AND NETWORK SYSTEM

(75) Inventors: Bing Liu, Shenzhen (CN); Yejian Xu, Shenzhen (CN); Meng Xu, Shenzhen (CN); Chengjiao Nie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/560,511

(22) Filed: Jul. 27, 2012

(65) Prior Publication Data

US 2012/0303949 A1 Nov. 29, 2012

Related U.S. Application Data

(63) Continuation of application No. PCT/CN2010/079593, filed on Dec. 9, 2010.

(30) Foreign Application Priority Data

Jan. 27, 2010 (CN) .......................... 2010 1 0104324

(51) Int. Cl.
*H04L 29/06* (2006.01)

(52) U.S. Cl.
USPC ................................ 713/153; 726/12; 726/15

(58) Field of Classification Search
None
See application file for complete search history.

(56) References Cited

U.S. PATENT DOCUMENTS

| 7,734,647 | B2 | 6/2010 | Suhonen et al. | |
| 2003/0140142 | A1 | 7/2003 | Marples et al. | |
| 2005/0060328 | A1* | 3/2005 | Suhonen et al. | 707/100 |
| 2007/0008924 | A1 | 1/2007 | Moran | |
| 2008/0201486 | A1 | 8/2008 | Hsu et al. | |
| 2009/0158420 | A1* | 6/2009 | Ks et al. | 726/15 |
| 2011/0040968 | A1 | 2/2011 | Liu et al. | |

FOREIGN PATENT DOCUMENTS

| CN | 1404263 A | 3/2003 |
| CN | 1561040 A | 1/2005 |
| CN | 1802821 A | 7/2006 |
| CN | 101252509 A | 8/2008 |
| CN | 101572643 A | 11/2009 |

(Continued)

OTHER PUBLICATIONS

International Search Report and Written Opinion of the International Searching Authority issued in corresponding PCT Patent Application No. PCT/CN2010/079593, mailed Mar. 10, 2011.
Office Action issued in corresponding Chinese Patent Application No. 201010104324.1, mailed May 25, 2011.

(Continued)

*Primary Examiner* — Fikremariam A Yalew
(74) *Attorney, Agent, or Firm* — Brinks, Gilson & Lione

(57) ABSTRACT

Embodiment of the present invention provides a packet transmission method. The method includes: receiving an encrypted packet sent by a client by using a virtual private network (VPN) tunnel, wherein the encrypted packet is sent by the client after the client determines, according to a preset control policy, that the control policy comprises an Internet Protocol (IP) address and a port number that are the same as a destination IP address and a destination port number of a packet to be sent and encrypts the packet to be sent, and the control policy comprises information about an IP address and a port number of an intranet server that can exchange a packet with a security socket layer protocol (SSL) VPN server; decrypting the encrypted packet; and sending the decrypted packet to a corresponding intranet server, wherein a source IP address of the decrypted packet is an external network IP address.

10 Claims, 9 Drawing Sheets

(56) References Cited

FOREIGN PATENT DOCUMENTS

| | | |
|---|---|---|
| CN | 101778045 A | 7/2010 |
| WO | WO 2006012612 A1 | 2/2006 |
| WO | WO 2007058981 A2 | 5/2007 |

OTHER PUBLICATIONS

Extended European Search Report issued in corresponding European Patent Application No. 10844465.4, mailed Feb. 26, 2013.

* cited by examiner

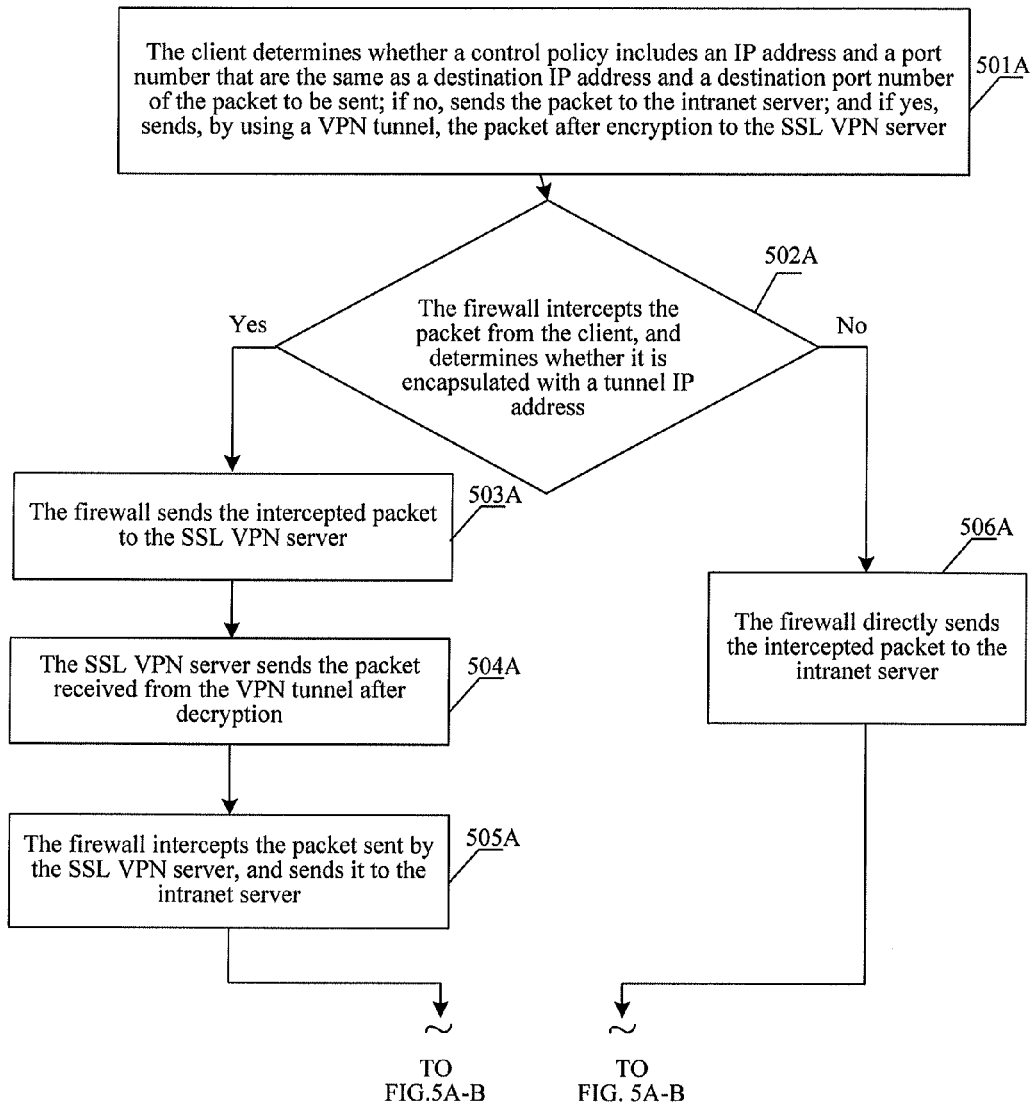
FIG. 5A-A

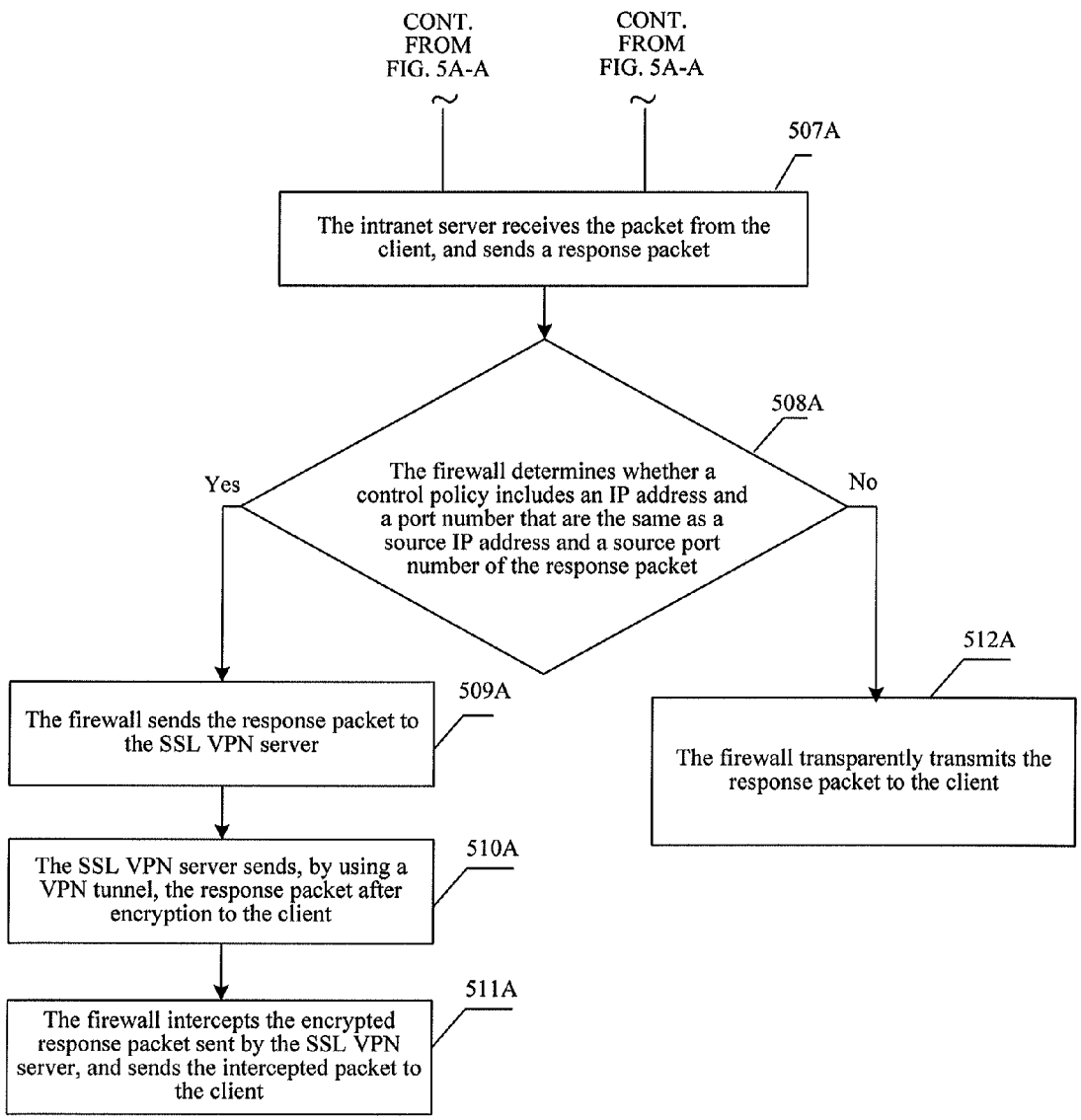
FIG. 5A-B

PACKET TRANSMISSION METHOD, APPARATUS, AND NETWORK SYSTEM

CROSS-REFERENCE TO RELATED APPLICATIONS

This application is a continuation of International Application No. PCT/CN2010/079593, filed on Dec. 9, 2010, which claims priority to Chinese Patent Application No. 201010104324.1, filed on Jan. 27, 2010, both of which are hereby incorporated by reference in their entireties.

FIELD OF THE INVENTION

The present invention relates to the field of communications technologies, and in particular to a packet transmission method, an apparatus, and a network system.

BACKGROUND OF THE INVENTION

On a security socket layer protocol (Security Socket Layer Protocol, SSL) virtual private network (Virtual Private Network, VPN), a client can access an intranet by using a network extension function after logging in to SSL VPN. Therefore, for packets of certain public services, the client may directly transmit them to the intranet; for packets of certain protected services, the client needs to transmit the packets of the protected services over SSL VPN to the intranet.

The network topological structure provided in the prior art is shown in FIG. 1. After the client logs in to SSL VPN, for a packet (that is, a packet of a public service) that does not need to be transmitted over SSL VPN, the client directly sends it without adding a tunnel IP address or using a VPN tunnel. The source IP address of the packet is an external network IP address (for example, the external network IP address of the packet sent by Port B in FIG. 1 is 50.1.1.1). For a packet (a packet of a protected service) that needs to be transmitted over SSL VPN, the client software sends it over the VPN tunnel after adding a tunnel IP address. In this case, the source IP address of the sent packet is an external network IP address (for example, the external network IP address of the packet sent by Port A in FIG. 1 is 50.1.1.1). The firewall sends the packet to SSL VPN according to the tunnel IP address. SSL VPN allocates a virtual IP address (for example 192.168.0.X in FIG. 1) to this client, and changes the source IP address (that is, external network IP address, for example, 50.1.1.1 in FIG. 1) to the virtual IP address (for example, 192.168.0.X in FIG. 1) so as to implement communication between the external network and the intranet. Accordingly, a private network segment corresponding to the virtual IP address is allocated on the intranet and is dedicated for the communication with the external network over SSL VPN.

During the implementation of the present invention, the inventor discovers the following: In the prior art, because a dedicated private network segment for communication with the external network over SSL VPN needs to be allocated on the intranet, the topological structure of the intranet will change. In addition, because a private network is allocated on the intranet, the management policy of the intranet will also change. Especially when multiple clients need to access the intranet over SSL VPN, a large number of virtual IP addresses need to be allocated, and multiple private networks need to be allocated on the intranet, thereby changing the topological structure of the intranet.

SUMMARY OF THE INVENTION

Embodiments of the present invention provide a packet transmission method, an apparatus, and a network system, which may transfer packets between an external network and an intranet over SSL VPN without changing a topological structure of the intranet.

According to an aspect, an embodiment of the present invention provides a method:

A packet transmission method, including:

receiving, by using a VPN tunnel, an encrypted packet sent by a client, where the encrypted packet is sent by the client after the client determines, according to a preset control policy, that the control policy includes an IP address and a port number that are the same as a destination IP address and a destination port number of a packet to be sent and encrypts the packet to be sent, and the control policy includes information about an IP address and a port number of an intranet server that can exchange packets with a security socket layer protocol virtual private network SSL VPN server;

decrypting the encrypted packet; and sending the decrypted packet to a corresponding intranet server, where a source IP address of the decrypted packet is an external network IP address.

A packet transmission method, including:

determining whether a preset control policy includes an IP address and a port number that are the same as a destination IP address and a destination port number of a packet to be sent, where the preset control policy includes information about an IP address and a port number of an intranet server that can exchange packets with an SSL VPN server;

when the preset control policy includes the IP address and port number that are the same as the destination IP address and destination port number of the packet to be sent, sending the packet to be sent over a VPN tunnel after encryption; and when the preset control policy does not include the IP address and port number that are the same as the destination IP address and destination port number of the packet to be sent, sending the packet to be sent, where the packet to be sent is sent without using the VPN tunnel.

An SSL VPN server, including:

a first receiving unit, configured to receive, by using a VPN tunnel, an encrypted packet sent by a client, where the encrypted packet is sent by the client after the client determines, according to a preset control policy, that the control policy includes an IP address and a port number that are the same as a destination IP address and a destination port number of a packet to be sent and encrypts the packet to be sent, and the control policy includes information about an IP address and a port number of an intranet server that can exchange packets with a security socket layer protocol virtual private network SSL VPN server;

a decrypting unit, configured to decrypt the encrypted packet; and a first sending unit, configured to send the decrypted packet to a corresponding intranet server, where a source IP address of the decrypted packet is an external network IP address.

A client, including:

a determining unit, configured to determine whether a preset control policy includes an IP address and a port number that are the same as a destination IP address and a destination port number of a packet to be sent, where the preset control policy includes information about an IP address and a port number of an intranet server that can exchange packets with an SSL VPN server;

an encrypting unit, configured to: when a judgment result of the determining unit is that the preset control policy includes the IP address and port number that are the same as the destination IP address and destination port number of the packet to be sent, encrypt the packet to be sent; and a sending unit, configured to: when the judgment result of the determining unit is that the preset control policy includes the IP address and port number that are the same as the destination IP address and destination port number of the packet to be sent, send, by using a VPN tunnel, the packet encrypted by the encrypting unit; and when the judgment result of the determining unit is that the preset control policy does not include the IP address and port number that are the same as the destination IP address and destination port number of the packet to be sent, directly send the packet to be sent, where the packet to be sent is sent without using the VPN tunnel.

A network system, including: the SSL VPN server and client.

According to this embodiment, the IP address and port number of the control policy are the IP address and port number of the intranet server corresponding to the SSL VPN server, and the packet of the client received by the SSL VPN server from the VPN tunnel is sent by the client after the client determines that the control policy includes the IP address and port number that are the same as the destination IP address and destination port number of the packet to be sent and encrypts the packet to be sent. Because the SSL VPN server may learn the network segment of the intranet server that processes this packet (at this time, the packet is a packet of a protected service) according to the destination IP address and destination port number of the packet, no virtual IP address needs to be allocated, but the source IP address of the packet remains unchanged, that is, the source IP address of the packet is still an external network IP address. As such, no dedicated private network segment for communication with the external network over SSL VPN needs to be allocated on the intranet server. Therefore, the network topology does not need to be changed.

BRIEF DESCRIPTION OF THE DRAWINGS

To illustrate the technical solutions in the embodiments of the present invention more clearly, the following briefly describes the accompanying drawings required for describing the embodiments of the present invention. Apparently, the accompanying drawings in the following description merely show some embodiments of the present invention, and persons of ordinary skill in the art can derive other drawings from these accompanying drawings without creative efforts.

FIG. 5A, which is shown as FIGS. 5A-A and 5A-B, is a flow chart of a packet transmission method according to still another embodiment of the present invention;

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are only a part rather than all of the embodiments of the present invention. All other embodiments, which can be derived by persons of ordinary skill in the art from the embodiments of the present invention without creative efforts, shall fall within the protection scope of the present invention.

Figure 1:
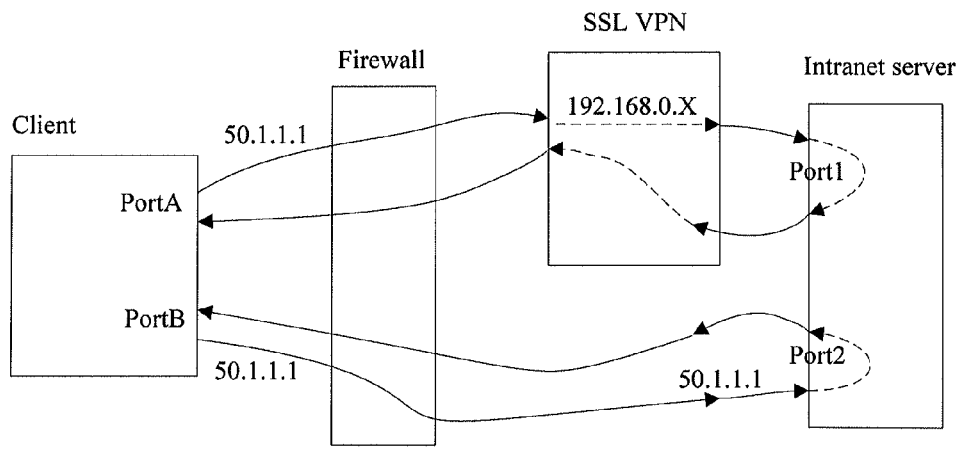
FIG. 1 is a schematic diagram of packet transmission in the prior art.
Figure 2:
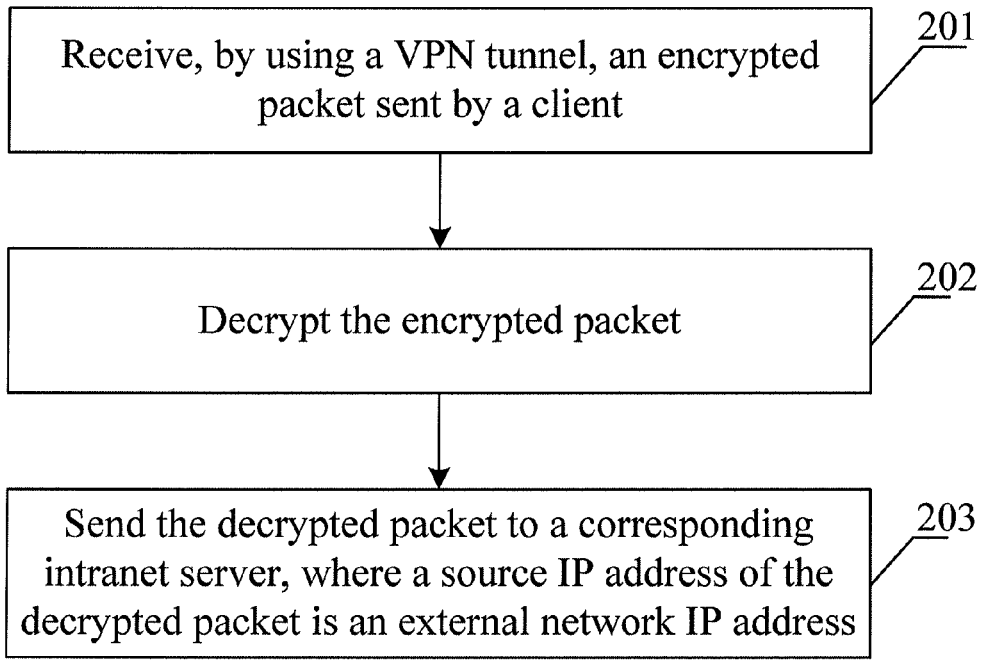
FIG. 2 is a flow chart of a packet transmission method according to an embodiment of the present invention.

FIG. 2 is a flow chart of a packet transmission method according to an embodiment of the present invention. The method includes the following:

201: Receive, by using a VPN tunnel, an encrypted packet sent by a client.

The encrypted packet is sent by the client after the client determines, according to a preset control policy, that the control policy includes an IP address and a port number that are the same as a destination IP address and a destination port number of a packet to be sent and encrypts the packet to be sent, the control policy includes information about an IP address and a port number of an intranet server that can exchange packets with a security socket layer protocol virtual private network SSL VPN server, and the IP address and port number of the intranet server can identify a specific network segment of the intranet server.

202: Decrypt the encrypted packet.

203: Send the decrypted packet to a corresponding intranet server.

The decrypted packet includes the destination IP address and destination port number, and a source IP address of the decrypted packet is an external network IP address.

The execution subject of each step in the method may be an SSL VPN server.

The SSL VPN server in this embodiment may be connected to a routing device and the intranet server, or the SSL VPN server may be connected to only the routing device but not to the intranet server. The routing device may be a firewall or a router.

When the SSL VPN server is connected to the routing device and intranet server, a packet sent by the client (including a packet sent by the client by using the VPN tunnel and a packet directly sent without using the VPN tunnel) is intercepted by the routing device. The routing device transparently transmits the intercepted packet to the SSL VPN server. The SSL VPN server transparently transmits the received packet that is sent without using the VPN tunnel to a corresponding intranet server. In addition, the SSL VPN server may further receive a response packet from the intranet server, send the response packet after encryption to the client by using the VPN tunnel when the preset control policy includes an IP address and a port number that are the same as a source IP address and a source port number of the response packet, and transparently transmit the response packet to the client when the preset control policy does not include the IP address and port number that are the same as the source IP address and source port number of the response packet.

When the SSL VPN server is connected to only the routing device but not to the intranet server, a decrypted packet sent by SSL VPN to the intranet server is intercepted by the routing device. The routing device sends the intercepted packet to the intranet server. The SSL VPN server further receives a response packet from the intranet server forwarded by the routing device, and sends the response packet after encryption to the client by using the VPN tunnel. The response packet is forwarded to the SSL VPN server after the routing device determines that the control policy includes an IP address and a port number that are the same as a source IP address and a source port number of the response packet.

According to this embodiment, the IP address and port number of the control policy are the IP address and port number of the intranet server corresponding to the SSL VPN server, and the packet of the client received by the SSL VPN server from the VPN tunnel is sent by the client after the client determines that the control policy includes the IP address and port number that are the same as the destination IP address and destination port number of the packet to be sent and encrypts the packet to be sent. Because the SSL VPN server may learn the network segment of the intranet server that processes this packet (at this time, the packet is a packet of a protected service) according to the destination IP address and destination port number of the packet, no virtual IP address needs to be allocated, but the source IP address of the packet remains unchanged, that is, the source IP address of the packet is still an external network IP address. As such, no dedicated private network segment for communication with the external network over SSL VPN needs to be allocated on the intranet server. Therefore, the network topology does not need to be changed.

Figure 3:
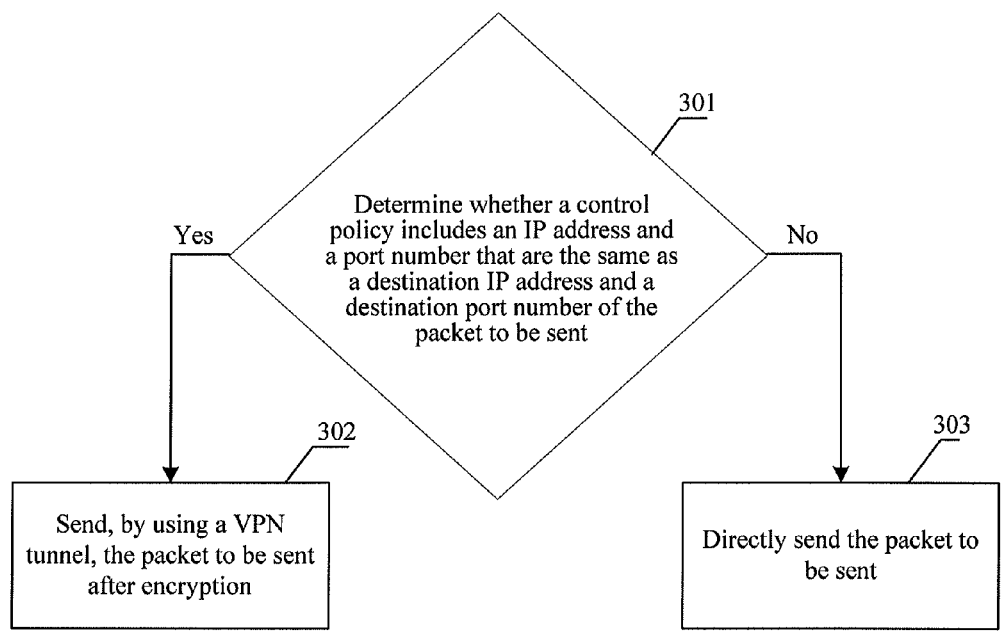
FIG. 3 is a flow chart of a packet transmission method according to another embodiment of the present invention.

FIG. 3 is a flow chart of a packet transmission method according to an embodiment of the present invention. The method includes the following:

301: Determine whether a preset control policy includes an IP address and a port number that are the same as a destination IP address and a destination port number of a packet to be sent, where the preset control policy includes information about an IP address and a port number of an intranet server that can exchange packets with an SSL VPN server; when the preset control policy includes the IP address and port number that are the same as the destination IP address and destination port number of the packet to be sent, execute step 302; and when the preset control policy does not include the IP address and port number that are the same as the destination IP address and destination port number of the packet to be sent, execute step 303.

The execution subject of each step in this embodiment may be a client. The control policy on the client is downloaded by the client from the SSL VPN server when the client logs in to SSL VPN. The control policy in this embodiment includes information about an IP address and a port number of an intranet server that can exchange packets with an SSL VPN server, and the IP address and port number of the intranet server can identify a specific network segment of the intranet server.

302: Send, by using a VPN tunnel, the packet to be sent after encryption. The procedure ends.

303: Send the packet to be sent, where the packet to be sent is sent without using the VPN tunnel.

The client determines whether the preset control policy includes the IP address and port number that are the same as the destination IP address and destination port number of the packet to be sent. The IP address and port number of the control policy are the IP address and port number of the intranet server that can exchange packets with the SSL VPN server. Therefore, if a judgment result is no, it indicates that the packet to be sent is a packet of a public service. Because a packet of a public service does not need to be sent over SSL VPN, the packet may be directly sent. In this case, the packet is sent without using the VPN tunnel. If the judgment result is yes, it indicates the packet to be sent is a packet of a protected service. As packets of protected services need to be transmitted over SSL VPN, the packet to be sent is encrypted and encapsulated a tunnel IP address before being sent by using the VPN tunnel.

According to this embodiment, the IP address and port number of the control policy are the IP address and port number of the intranet server corresponding to the SSL VPN server, and the client sends, by using the VPN tunnel, the packet to be sent after determining that the control policy includes the IP address and port number that are the same as the destination IP address and destination port number of the packet to be sent and encrypting the packet so that the SSL VPN server may learn the network segment of the intranet server that processes the packet according to the destination IP address and destination port number of the packet. Therefore, no virtual IP address needs to be allocated, but the source IP address of the packet remains unchanged, that is, the source IP address of the packet is still an external network IP address. As such, no dedicated private network segment for communication with the external network over SSL VPN needs to be allocated on the intranet server. Therefore, the network topology does not need to be changed.

To illustrate the technical solutions provided in the present invention more clearly, the following two embodiments describe the technical solutions provided in the present invention in detail.

Figure 4A:
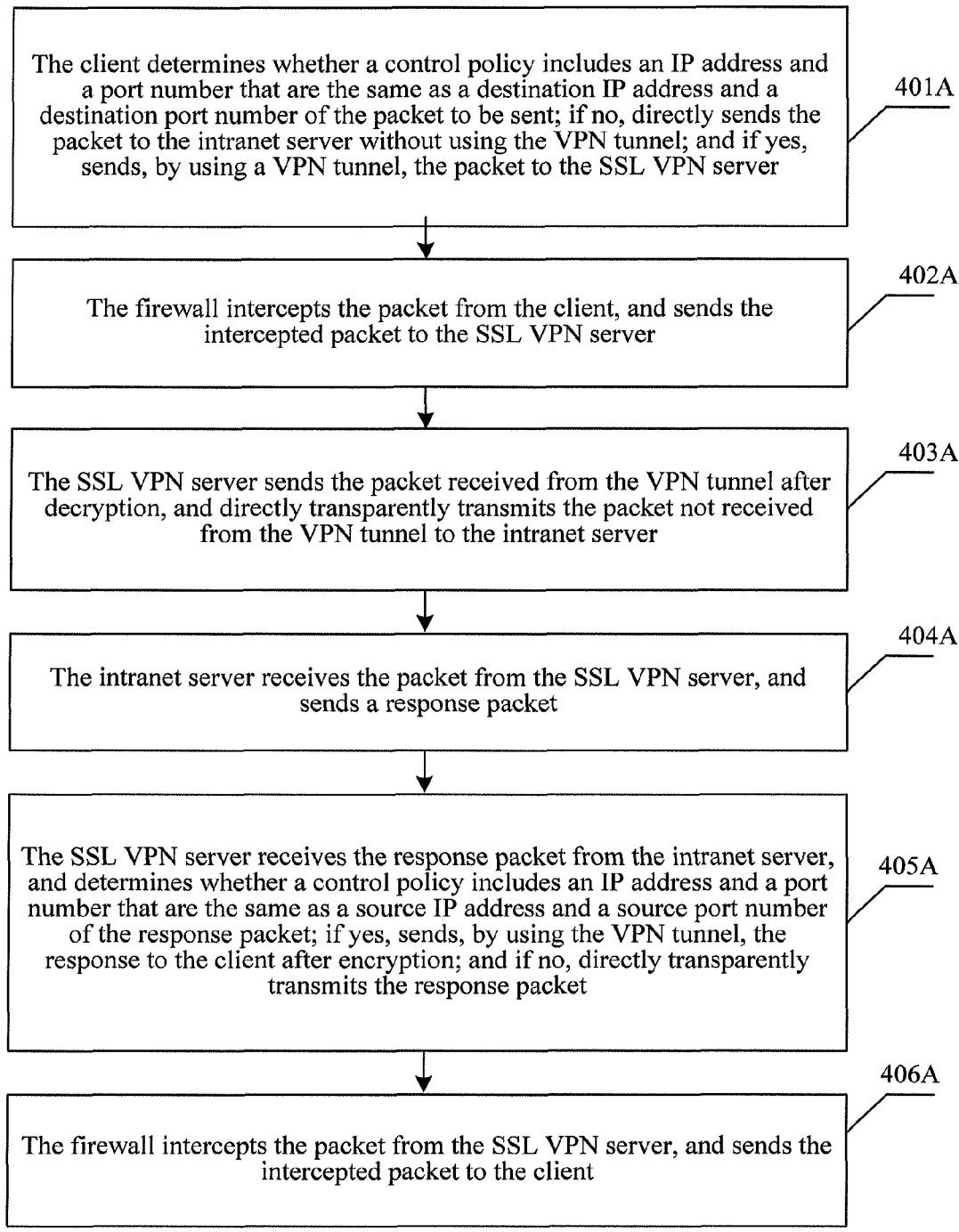
FIG. 4A is a flow chart of a packet transmission method according to still another embodiment of the present invention.
Figure 4B:
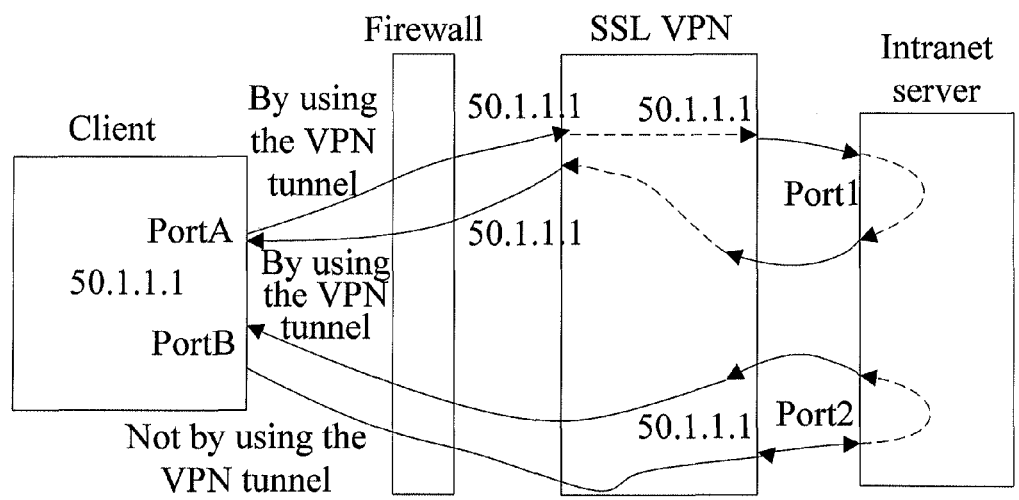
FIG. 4B is a schematic diagram of packet transmission according to still another embodiment of the present invention.

As shown in FIG. 4A and FIG. 4B, an embodiment of the present invention provides a packet transmission method. In this embodiment, SSL VPN is connected to a routing device and an intranet server, and the routing device is a firewall. The packet transmission method includes the following:

401A: A client determines whether a preset control policy includes an IP address and a port number that are the same as a destination IP address and a destination port number of a packet to be sent; if no, directly sends the packet (refer to the packet sent from Port B in FIG. 4B) to the intranet server without using a VPN tunnel; and if yes, encrypts the packet to be sent (refer to the packet sent from Port A in FIG. 4B), encapsulates a tunnel IP address, and then sends, by using the VPN tunnel, the packet to an SSL VPN server.

It should be noted that, before this step, when the client logs in to SSL VPN, the client needs to download the control policy from the SSL VPN server.

402A: A firewall intercepts a packet from the client, and sends the intercepted packet to the SSL VPN server.

403A: The SSL VPN server decrypts the packet received from the VPN tunnel, sends the decrypted packet to the intranet server, where a source IP address of the decrypted packet is an external network IP address, stores a destination IP address and a destination port number of the decrypted packet and a mapping relationship between the destination IP address and the destination port number, and the VPN tunnel (the VPN tunnel is the VPN tunnel for receiving the packet), and directly transparently transmits a packet received without using the VPN tunnel to the intranet server.

404A: The intranet server receives the packet output by the SSL VPN server, and returns a response packet in response to the received packet, where a source IP address and a source port number of the response packet are the destination IP address and destination port number of the received packet, respectively.

405A: The SSL VPN server receives the response packet from the intranet server, and determines whether the preset control policy includes an IP address and a port number that are the same as the source IP address and source port number of the response packet; if yes, determines a VPN tunnel corresponding to the source IP address and source port number according to the mapping relationship stored in step 403A, and encrypts the response packet (for example, the packet sent from Port 1 in FIG. 4B) before sending, by using the VPN tunnel, the packet to the client; and if no, directly transparently transmits the response packet (for example, the packet sent from Port 2 in FIG. 4B).

In this step, the SSL VPN server determines whether the preset control policy includes the IP address and port number that are the same as the source IP address and source port number of the response packet. If the preset control policy does not include the IP address and port number that are the same as the source IP address and source port number of the response packet, it indicates that the response packet is a packet of a public service. Because a packet of a public service does not need to be sent over SSL VPN, the packet may be directly transparently transmitted. In this case, the response packet is directly transparently transmitted. If the preset control policy includes the IP address and port number that are the same as the source IP address and source port number of the response packet, it indicates the response packet is a packet of a protected service. As packets of protected services need to be transmitted by using the VPN tunnel, the packet of the protected service is encrypted and encapsulated a tunnel IP address before being sent by using the VPN tunnel.

406A: The firewall intercepts a packet from the SSL VPN server, and sends the intercepted packet to the client.

According to this embodiment, the client determines whether the packet to be sent is sent by using the VPN tunnel by determining whether the control policy includes an IP address and a port number that are the same as the destination IP address and destination port number of the packet to be sent. The SSL VPN server determines whether the response packet is sent by using the VPN tunnel by determining whether the control policy includes an IP address and a port number that are the same as the source IP address and source port number of the response packet. As both the packet to be sent and the response packet include the IP address and port number of the intranet server, which allow the SSL VPN server to learn the network segment of the intranet server that exchanges packets with itself, the SSL VPN server does not need to convert the IP address when the client accesses the intranet server over SSL VPN, implementing the function of providing SSL VPN access protection without changing the network topology of the intranet server.

Figure 5B:
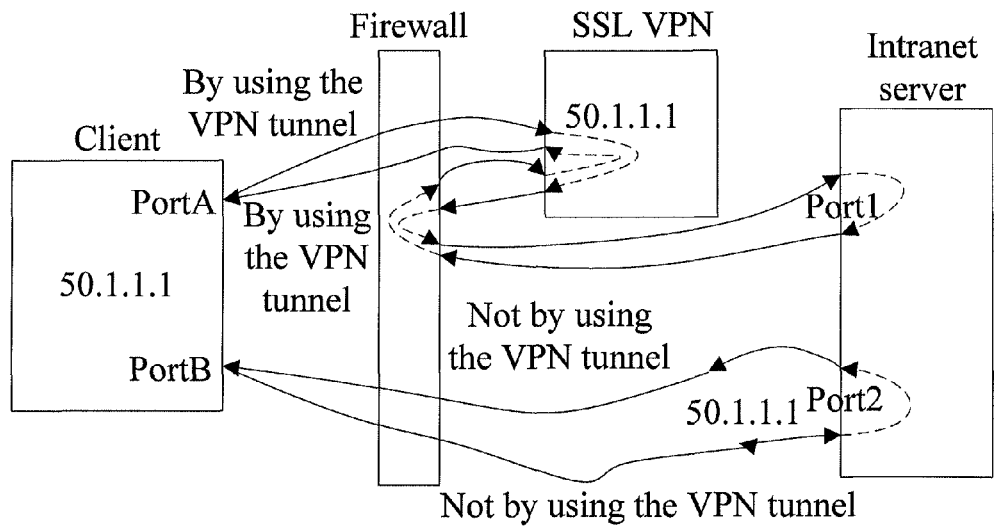
FIG. 5B is a schematic diagram of packet transmission according to still another embodiment of the present invention.

As shown in FIG. 5A and FIG. 5B, another embodiment of the present invention provides a packet transmission method. In this embodiment, SSL VPN is connected to only a routing device but not to an intranet server. The routing device in this embodiment is a firewall. The packet transmission method specifically includes the following:

501A: A client determines whether a preset control policy includes an IP address and a port number that are the same as a destination IP address and a destination port number of a packet to be sent; if no, directly sends the packet (refer to the packet sent from Port B in FIG. 5B) to the intranet server without using a VPN tunnel; and if yes, encrypts the packet to be sent (refer to the packet sent from Port A in FIG. 4B), encapsulates a tunnel IP address, and then sends, by using the VPN tunnel, the packet to an SSL VPN server, and go to 502A.

It should be noted that before this step, when logging in to SSL VPN, the client needs to download the control policy from the SSL VPN server.

502A: The firewall intercepts the packet from the client. When it is determined that the intercepted packet is encapsulated a tunnel IP address (that is, the intercepted packet from the client is a packet sent by the client by using the VPN tunnel), go to 503A; when it is determined that the intercepted packet is not encapsulated a tunnel IP address (that is, the intercepted packet from the client is a packet sent by the client without using the VPN tunnel), go to 506A.

503A: The firewall sends the intercepted packet to the SSL VPN server. Go to 504A.

504A: The SSL VPN server sends the packet received from the VPN tunnel after decryption, where the source IP address of the decrypted packet is an external network IP address, and stores a mapping relationship between a destination IP address and a destination port number of the decrypted packet and the VPN tunnel (the VPN tunnel is the VPN tunnel for receiving the packet). Go to 505A.

505A: The firewall intercepts the packet sent by the SSL VPN server, and sends it to the intranet server. Go to 507A.

506A: The firewall directly sends the intercepted packet to the intranet server. Go to 507A.

507A: The intranet server receives the packet from the client, and sends a response packet in response to the received packet, where the source IP address and source port number of the response packet are the destination IP address and destination port number of the received packet, respectively. Go to 508A.

508A: The firewall intercepts the response packet from the intranet server, and determines whether the preset control policy includes an IP address and a port number that are the same as the source IP address and source port number of the response packet. If yes, go to 509A; if no, go to 512A.

509A: The firewall sends the response packet to the SSL VPN server. Go to 510A.

For details, refer to the packet sent from Port 1 in FIG. 5B.

510A: The SSL VPN server determines a VPN tunnel corresponding to the source IP address and source port number according to the source IP address and source port number of the response packet and the stored mapping relationship, encrypts the response packet, and encapsulates it with a tunnel IP address before sending the packet to the client by using the determined VPN tunnel. Go to 511A.

511A: The firewall intercepts the encrypted response packet sent by the SSL VPN server, and sends the intercepted packet to the client. The procedure ends.

512A: The firewall transparently transmits the response packet from the intranet server to the client.

For details, refer to the packet sent from Port 2 in FIG. 5B.

According to this embodiment, the client determines whether the packet to be sent is sent by using the VPN tunnel by determining whether the control policy includes an IP address and a port number that are the same as the destination IP address and destination port number of the packet to be sent. The firewall determines whether the response packet is sent by using the VPN tunnel by determining whether the control policy includes an IP address and a port number that are the same as the source IP address and source port number of the response packet. As both the packet to be sent and the response packet include the IP address and port number of the intranet server, which allow the SSL VPN server to learn the network segment of the intranet server that exchanges packets with itself, the SSL VPN server does not need to convert the IP address when the client accesses the intranet server over SSL VPN, implementing the function of providing SSL VPN access protection without changing the network topology of the intranet server. Further, according to this method, the SSL VPN server is deployed in a bypass manner behind the firewall, so that the firewall can still directly send packets of public services to the intranet server when the SSL VPN server is abnormal, preventing these public services from being interrupted.

Figure 6A:
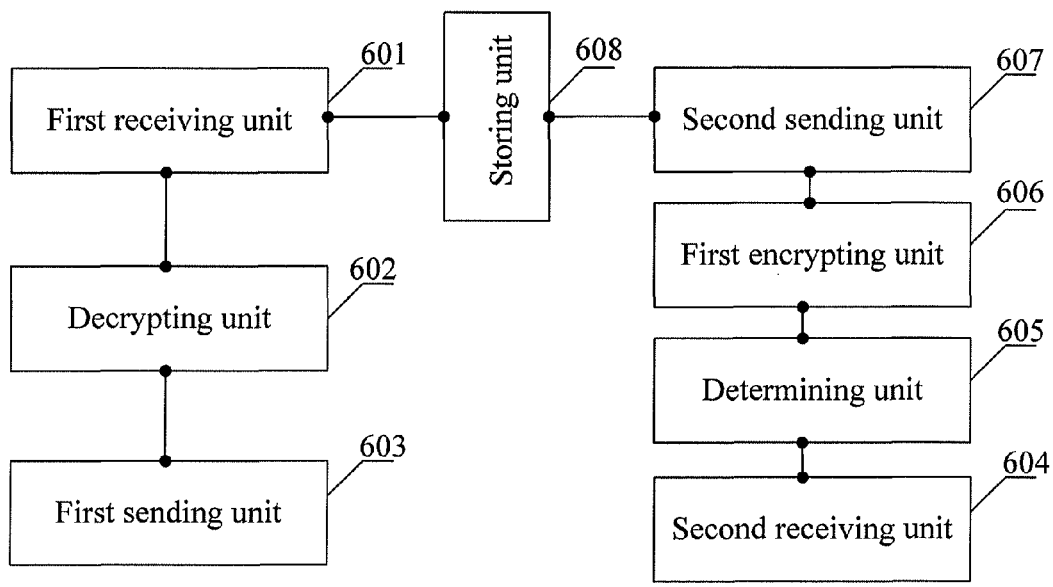
FIG. 6A is a structural schematic diagram of an SSL VPN server according to an embodiment of the present invention.
Figure 6B:
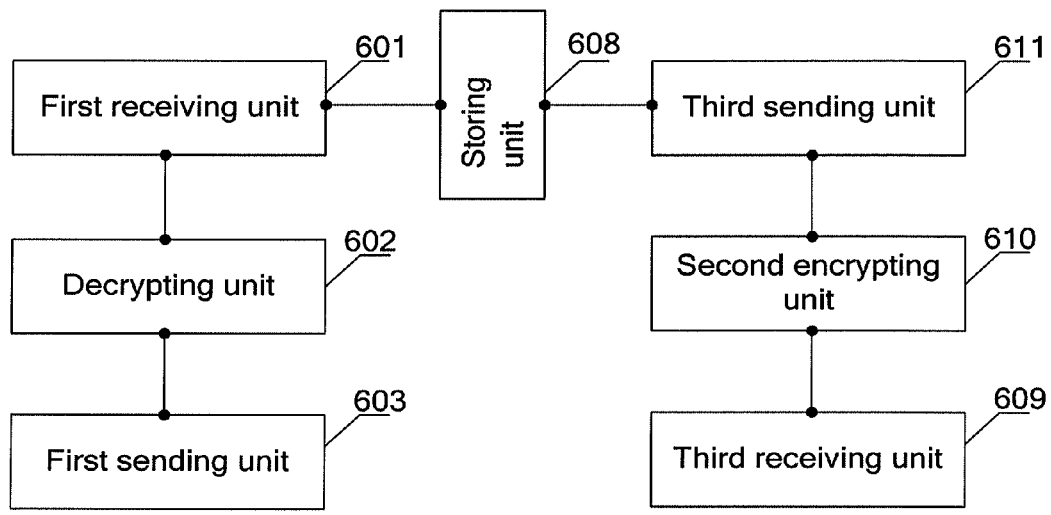
FIG. 6B is a structural schematic diagram of another SSL VPN server according to an embodiment of the present invention.

As shown in FIG. 6A and FIG. 6B, an embodiment of the present invention provides an SSL VPN server, where the SSL VPN server may include:

a first receiving unit 601, configured to receive, by using a VPN tunnel, an encrypted packet sent by a client;

The encrypted packet is sent by the client after the client determines, according to a preset control policy, that the control policy includes an IP address and a port number that are the same as a destination IP address and a destination port number of a packet to be sent and encrypts the packet to be sent, and the control policy includes information about an IP address and a port number of an intranet server that can exchange packets with a security socket layer protocol virtual private network SSL VPN server.

a decrypting unit 602, configured to decrypt the encrypted packet; and a first sending unit 603, configured to send the decrypted packet to a corresponding intranet server, where a source IP address of the decrypted packet is an external network IP address.

Specifically, the first receiving unit 601 is further configured to receive, without using the VPN tunnel, a packet sent by a client; the first sending unit 603 is further configured to transparently transmit the packet received without using the VPN tunnel to a corresponding intranet server.

Further, in one case, as shown in FIG. 6A, the SSL VPN server according to this embodiment may further include:

a second receiving unit 604, configured to receive a response packet from the intranet server;

a determining unit 605, configured to determine whether the preset control policy includes an IP address and a port number that are the same as a source IP address and a source port number of the response packet;

a first encrypting unit 606, configured to encrypt the response packet when a judgment result of the determining unit 605 is that the preset control policy includes the IP address and the port number that are the same as the source IP address and the source port number of the response packet; and a second sending unit 607, configured to transparently transmit the response packet to the client when the judgment result of the determining unit 605 is that the preset control policy does not include the IP address and the port number that are the same as the source IP address and the source port number of the response packet; and send the response packet encrypted by the first encrypting unit 606 to the client when the judgment result of the determining unit 605 is that the preset control policy includes the IP address and the port number that are the same as the source IP address and the source port number of the response packet.

Further, this embodiment may further include:

a storing unit 608, configured to store a mapping relationship between the destination IP address and destination port number of the decrypted packet and the VPN tunnel.

Specifically, the second sending unit 607 sends the response packet encrypted by the first encrypting unit 606 to the client by using the VPN tunnel corresponding to the source IP address and source port number according to the mapping relationship stored by the storing unit 608 when the judgment result of the determining unit 605 is yes.

Further, in another case, as shown in FIG. 6B, the SSL VPN server according to this embodiment may further include:

a storing unit 608, configured to store a mapping relationship between the destination IP address and destination port number of the decrypted packet and the VPN tunnel;

a third receiving unit 609, configured to receive a response packet from the intranet server forwarded by a routing device, where the response packet is forwarded to the SSL VPN server by the routing device after the routing device determines according to a preset control policy that the control policy includes an IP address and a port number that are the same as the source IP address and source port number of the response packet;

a second encrypting unit 610, configured to encrypt the response packet; and a third sending unit 611, configured to send the response packet encrypted by the second encrypting unit 610 to the client.

Specifically, the third sending unit 611 may send the response packet encrypted by the second encrypting unit 610 to the client by using the VPN tunnel corresponding to the source IP address and source port number according to the mapping relationship stored by the storing unit 608.

According to this embodiment, the IP address and port number of the control policy are the IP address and port number of the intranet server corresponding to the SSL VPN server, and the packet of the client received by the SSL VPN server from the VPN tunnel is sent by the client after the client determines that the control policy includes the IP address and port number that are the same as the destination IP address and destination port number of the packet to be sent and encrypts the packet to be sent. Because the SSL VPN server may learn the network segment of the intranet server that processes this packet (at this time, the packet is a packet of a protected service) according to the destination IP address and destination port number of the packet, no virtual IP address needs to be allocated, but the source IP address of the packet remains unchanged, that is, the source IP address of the packet is still an external network IP address. As such, no dedicated private network segment for communication with the external network over SSL VPN needs to be allocated on the intranet server. Therefore, the network topology does not need to be changed.

Figure 7:
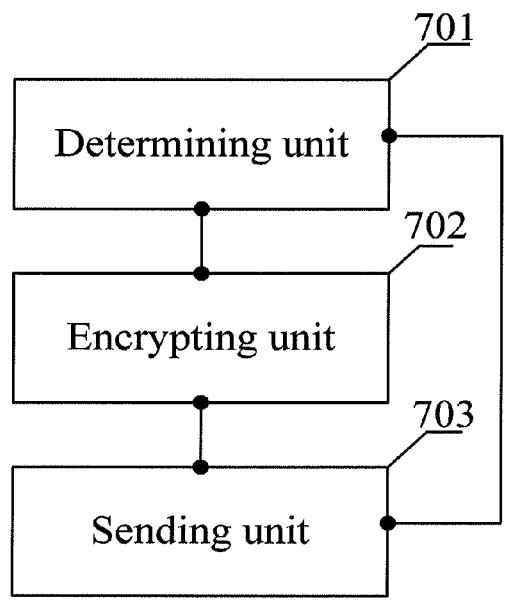
FIG. 7 is a structural schematic diagram of a client according to an embodiment of the present invention.

As shown in FIG. 7, an embodiment of the present invention provides a client, including:

a determining unit 701, configured to determine whether a preset control policy includes an IP address and a port number that are the same as a destination IP address and a destination port number of a packet to be sent, where the preset control policy includes information about an IP address and a port number of an intranet server that can exchange packets with an SSL VPN server;

an encrypting unit 702, configured to: when a judgment result of the determining unit 701 is that the preset control policy includes the IP address and port number that are the same as the destination IP address and destination port number of the packet to be sent, encrypt the packet to be sent; and a sending unit 703, configured to: send, by using a VPN tunnel, the packet encrypted by the encrypting unit 702; or when the judgment result of the determining unit 701 is that the preset control policy does not include the IP address and port number that are the same as the destination IP address and destination port number of the packet to be sent, directly send the packet to be sent, where the packet to be sent is sent without using the VPN tunnel.

The client determines whether the preset control policy includes the IP address and port number that are the same as the destination IP address and destination port number of the packet to be sent. The IP address and port number of the control policy are the IP address and port number of the intranet server that can exchange packets with the SSL VPN server. Therefore, if a judgment result is no, it indicates that the packet to be sent is a packet of a public service. Because a packet of a public service does not need to be sent over SSL VPN, the packet may be directly sent. In this case, the packet is sent without using the VPN tunnel. If the judgment result is yes, it indicates the packet to be sent is a packet of a protected service. As packets of protected services need to be transmitted over SSL VPN, the packet to be sent is encrypted and encapsulated a tunnel IP address before being sent by using the VPN tunnel.

According to this embodiment, the IP address and port number of the control policy are the IP address and port number of the intranet server corresponding to the SSL VPN server, and the client sends the packet to be sent by using the VPN tunnel after determining that the control policy includes the IP address and port number that are the same as the destination IP address and destination port number of the packet to be sent and encrypting the packet so that the SSL VPN server may learn the network segment of the intranet server that processes the packet according to the destination IP address and destination port number of the packet. Therefore, no virtual IP address needs to be allocated, but the source IP address of the packet remains unchanged, that is, the source IP address of the packet is still an external network IP address. As such, no dedicated private network segment for communication with the external network over SSL VPN needs to be allocated on the intranet server. Therefore, the network topology does not need to be changed.

Figure 8A:
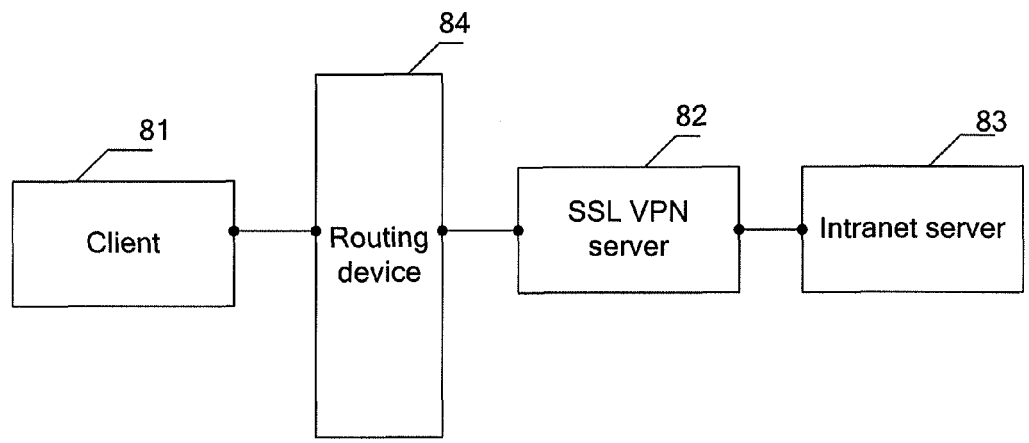
FIG. 8A is a structural schematic diagram of a network system according to an embodiment of the present invention.
Figure 8B:
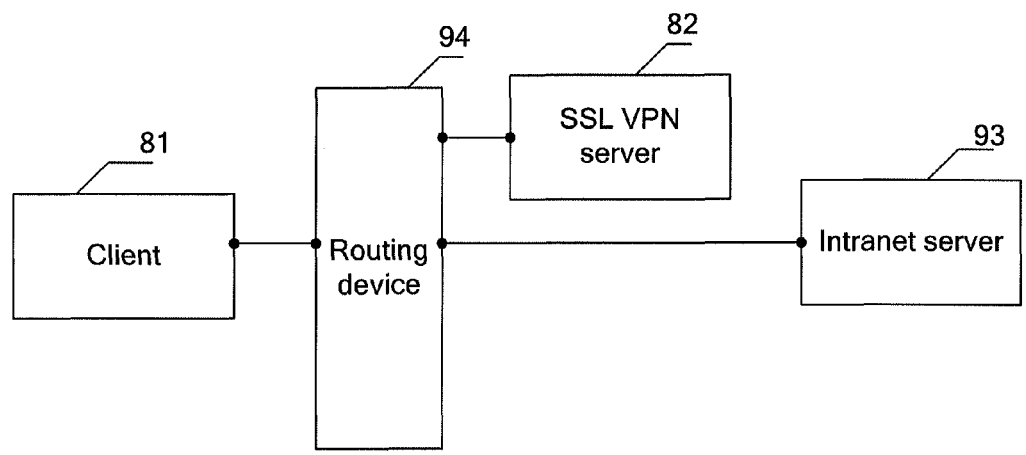
FIG. 8B is a structural schematic diagram of a network system according to another embodiment of the present invention.

As shown in FIG. 8A and FIG. 8B, an embodiment of the present invention provides a network system, including a client 81 and an SSL VPN server 82.

The client 81 is configured to: determine whether a preset control policy includes an IP address and a port number that are the same as a destination IP address and a destination port number of a packet to be sent, where the preset control policy includes information about an IP address and a port number of an intranet server that can exchange packets with an SSL VPN server; when the preset control policy includes the IP address and port number that are the same as the destination IP address and destination port number of the packet to be sent, send, by using a VPN tunnel, the packet to be sent after encryption; and when the preset control policy does not include the IP address and port number that are the same as the destination IP address and destination port number of the packet to be sent, directly send the packet to be sent, where the directly sent packet to be sent is not sent by using the VPN tunnel.

The SSL VPN server 82 is configured to: receive an encrypted packet sent by the client by using the VPN tunnel, where the encrypted packet is sent by the client after the client determines, according to the preset control policy, that the control policy includes the IP address and port number that are the same as the destination IP address and destination port number of the packet to be sent and encrypts the packet to be sent, and the control policy comprises information about an IP address and a port number of an intranet server that can exchange packets with a security socket layer protocol virtual private network SSL VPN server; send the decrypted packet to a corresponding intranet server, where a source IP address of the decrypted packet is an external network IP address; receive without using a VPN tunnel the packet sent by the client; and transparently transmit the packet received without using the VPN tunnel to a corresponding intranet server.

As shown in FIG. 8A, the network system further includes an intranet server 83 and a routing device 84. In this case, the SSL VPN server 82 is deployed between the routing device 84 and the intranet server 83 in a direct path manner.

The routing device may be configured to intercept a packet from the client, and send the intercepted packet to the SSL VPN server 82.

The intercepted packet includes the packet sent by the client 81 by using the VPN tunnel and the packet sent without using the VPN tunnel.

The SSL VPN server 82 is further configured to receive a response packet from the intranet server 83, send, by using the VPN tunnel, the response packet after encryption to the client when the preset control policy includes an IP address and a port number that are the same as a source IP address and a source port number of the response packet, and transparently transmit the response packet to the client when the preset control policy does not include the IP address and port number that are the same as the source IP address and source port number of the response packet.

Or, as shown in FIG. 8B, the network system further includes an intranet server 93 and a routing device 94. In this case, the SSL VPN server 82 is connected only to the routing device 94 but not to the intranet server 93.

The routing device 94 is configured to: intercept a packet from the client; when the intercepted packet is a packet sent by the client by using the VPN tunnel, send the intercepted packet to the SSL VPN server; and intercept a decrypted packet sent by the SSL VPN server and send it to the intranet server.

The routing device is further configured to intercept a response packet from the intranet server, and determine whether a preset control policy includes an IP address and a port number that are the same as a source IP address and a source port number of the response packet; if yes, forward the response packet to the SSL VPN server; if no, transparently transmit the response packet to the client.

The SSL VPN server is further configured to receive the response packet from the intranet server forwarded by the routing device, and send, by using the VPN tunnel, the response packet after encryption to the client.

The routing device in this embodiment may be a firewall or a router.

According to this embodiment, the client determines whether the packet to be sent is sent by using the VPN tunnel by determining whether the control policy includes an IP address and a port number that are the same as the destination IP address and destination port number of the packet to be sent. The SSL VPN server or routing device determines whether the response packet is sent by using the VPN tunnel by determining whether the control policy includes an IP address and a port number that are the same as the source IP address and source port number of the response packet. As both the packet to be sent and the response packet include the IP address and port number of the intranet server, which allow the SSL VPN server to learn the network segment of the intranet server that exchanges packets with itself, the SSL VPN server does not need to convert the IP address when the client accesses the intranet server by using the SSL VPN, implementing the function of providing SSL VPN access protection without changing the network topology of the intranet server. Further, according to this method, the SSL VPN server is deployed in a bypass manner behind the firewall, so that the firewall can still directly send packets of public services to the intranet server when the SSL VPN server is abnormal, preventing these public services from being interrupted.

Persons of ordinary skill in the art should understand that all or part of the steps of the method provided in the embodiments above may be implemented by a program instructing relevant hardware. The program may be stored in a computer readable storage medium, for example, a read-only memory, a magnetic disk, or an optical disk.

A packet transmission method, an apparatus, and a network system thereof are provided in the preceding embodiments of the present invention. Several examples are adapted for illustration of the principles and implementation methods of the present invention. The description of these examples is adapted to help illustrate the method and its core principles in an embodiment of the present invention. Those skilled in the art can make various modifications and variations to the invention without departing from the scope of the invention. The invention is intended to cover the modifications and variations provided that they fall in the scope of protection defined by the invention.

What is claimed is:

1. A packet transmission method, comprising:
   receiving, by a Security Socket Layer Protocol (SSL) Virtual Private Network (VPN) server, an encrypted packet sent by a client device through a VPN tunnel, wherein the encrypted packet is sent by the client device after the client device determines, according to a preset control policy, that a destination Internet Protocol (IP) address and a destination port of a packet to be sent are included in the control policy and encrypts the packet to be sent, and an IP address and a port included in the preset control policy are an IP address and a port of an intranet server that can exchange a packet with the SSL VPN server;
   decrypting, by the SSL VPN server, the encrypted packet;
   sending, by the SSL VPN server, the decrypted packet to a corresponding intranet server, wherein a source IP address of the decrypted packet is an external network IP address;
   storing, by the SSL VPN server, a mapping relationship between the destination IP address and the destination port of the decrypted packet and the VPN tunnel;
   receiving, by the SSL VPN server, a response packet from the intranet server; and
   according to the source IP address and source port of the response packet and the stored mapping relationship, sending, by the SSL VPN server, the response packet after encryption to the client device through the VPN tunnel corresponding to the source IP address and source port after a determination that a source IP address and a source port of the response packet are included in the control policy.

2. The method according to claim 1, further comprising:
   receiving, by the SSL VPN server, a packet sent by the client device not through the VPN tunnel; and
   transmitting, by the SSL VPN server, the packet received without using the VPN tunnel to a corresponding intranet server.

3. A packet transmission method, comprising:
   receiving, by a Security Socket Layer Protocol (SSL) Virtual Private Network (VPN) server, an encrypted packet sent by a client device through a VPN tunnel, wherein the encrypted packet is sent by the client device after the client device determines, according to a preset control policy, that a destination Internet Protocol (IP) address and a destination port of a packet to be sent are included in the control policy and encrypts the packet to be sent, and an IP address and a port included in the preset control policy are an IP address and a port of an intranet server that can exchange a packet with the SSL VPN server;
   decrypting, by the SSL VPN server, the encrypted packet;
   sending, by the SSL VPN server, the decrypted packet to a corresponding intranet server, wherein a source IP address of the decrypted packet is an external network IP address;
   storing a mapping relationship between the destination IP address and the destination port of the decrypted packet and the VPN tunnel;
   receiving, by the SSL VPN server, a response packet which is sent from the intranet server and forwarded by a routing device, wherein the response packet is forwarded to the SSL VPN server by the routing device after the routing device determines, according to a preset control policy, that a source IP address and a source port of the response packet are included in the preset control policy; and
   according to the source IP address and source port of the response packet and the stored main relationship, sending, by the SSL VPN server, the response packet after encryption to the client device through the VPN tunnel corresponding to the source IP address and source port.

4. A Security Socket Layer Protocol (SSL) Virtual Private Network (VPN) server, comprising:
   a first receiving unit, configured to receive an encrypted packet sent by a client through a VPN tunnel, wherein the encrypted packet is sent by the client device after the client device determines, according to a preset control policy, that a destination Internet Protocol (IP) address and a destination port of a packet to be sent are included in the preset control policy and encrypts the packet to be sent, and an IP address and a port included in the preset control policy are an IP address and a port of an intranet server that can exchange a packet with the SSL VPN server;
   a decrypting unit, configured to decrypt the encrypted packet;
   a first sending unit, configured to send the decrypted packet to a intranet server, wherein a source IP address of the decrypted packet is an external network IP address;
   a storing unit, configured to store a mapping relationship between the destination IP address and the destination port of the packet, decrypted by the decrypting unit, and the VPN tunnel;
   a second receiving unit, configured to receive a response packet from the intranet server;
   a determining unit, configured to determine whether a source IP address and a source port of the response packet are included in the control policy;
   a first encrypting unit, configured to encrypt the response packet after the determining unit determines that a source IP address and a source port of the response packet are included in the control policy; and
   a second sending unit, configured to send the encrypted response packet to the client device through the VPN tunnel corresponding to the source IP address and source port number of the encrypted response packet according to the mapping relationship stored by the storing unit after the determining unit determines that the source IP address and the source port of the response packet are included in the control policy.

5. The SSL VPN server according to claim 4, wherein:
the first receiving unit is further configured to receive, without using the VPN tunnel, a packet sent by the client device; and
the first sending unit is further configured to transmit the packet received without using the VPN tunnel to a intranet server.

6. A Security Socket Layer Protocol (SSL) Virtual Private Network (VPN) server, comprising:
a first receiving unit, configured to receive an encrypted packet sent by a client through a VPN tunnel, wherein the encrypted packet is sent by the client device after the client device determines, according to a preset control policy, that a destination Internet Protocol (IP) address and a destination port of a packet to be sent are included in the preset control policy and encrypts the packet to be sent, and an IP address and a port included in the preset control policy are an IP address and a port of an intranet server that can exchange a packet with the SSL VPN server;
a decrypting unit, configured to decrypt the encrypted packet;
a first sending unit, configured to send the decrypted packet to a intranet server, wherein a source IP address of the decrypted packet is an external network IP address;
a third receiving unit, configured to receive a response packet which is sent from the intranet server and is forwarded by a routing device, wherein the response packet is forwarded to the SSL VPN server by the routing device after the routing device determines, according to the preset control policy, that a source IP address and a source port of the response packet are included in the preset control policy;
a second encrypting unit, configured to encrypt the response packet; and
a third sending unit, configured to send the response packet encrypted by the second encrypting unit to the client device through the VPN tunnel.

7. The method according to claim 1, further comprising:
transmitting, by the SSL VPN server, the response packet to the client device after a determination that the source IP address and the source port of the response packet are not included in the control policy.

8. The SSL VPN server according to claim 4, wherein the second sending unit is further configured to transmit the response packet to the client device after the determining unit determines that the source IP address and the source port of the response packet are not included in the control policy.

9. The method according to claim 3, further comprising:
receiving, by the SSL VPN server, a packet sent by the client device not through the VPN tunnel; and
transmitting, by the SSL VPN server, the packet received without using the VPN tunnel to a corresponding intranet server.

10. The SSL VPN server according to claim 6, wherein:
the first receiving unit is further configured to receive, without using the VPN tunnel, a packet sent by the client device; and
the first sending unit is further configured to transmit the packet received without using the VPN tunnel to a intranet server.

* * * * *

UNITED STATES PATENT AND TRADEMARK OFFICE
CERTIFICATE OF CORRECTION

PATENT NO.         : 8,713,305 B2                                  Page 1 of 1
APPLICATION NO.    : 13/560511
DATED              : April 29, 2014
INVENTOR(S)        : Bing Liu et al.

It is certified that error appears in the above-identified patent and that said Letters Patent is hereby corrected as shown below:

In the Claims

In column 14, claim 3, line 27, after "packet and the stored" replace "main" with --mapping--.

Signed and Sealed this
Ninth Day of September, 2014

Michelle K. Lee
*Deputy Director of the United States Patent and Trademark Office*